United States Patent [19]

Sherrick

[11] Patent Number: 5,072,616
[45] Date of Patent: Dec. 17, 1991

[54] FIBER OPTIC LEVEL ALARM

[75] Inventor: Ronald E. Sherrick, Lancaster, Ohio

[73] Assignee: The Babcock & Wilcox Company, New Orleans, La.

[21] Appl. No.: 368,082

[22] Filed: Jun. 16, 1989

Related U.S. Application Data

[63] Continuation of Ser. No. 816,968, Jan. 8, 1986, abandoned, which is a continuation-in-part of Ser. No. 564,941, Dec. 23, 1983, abandoned.

[51] Int. Cl.⁵ .............................................. G01F 23/02
[52] U.S. Cl. ........................................ 73/293; 73/327; 250/577
[58] Field of Search .................... 73/293, 323, 327; 340/619; 250/577, 573, 574; 356/399; 116/202; 362/32

[56] References Cited

U.S. PATENT DOCUMENTS

| | | | |
|---|---|---|---|
| 2,024,815 | 12/1935 | Blackburn | 73/327 |
| 2,115,899 | 5/1938 | Blackburn | 73/293 |
| 2,198,443 | 4/1940 | Paul et al. | 116/202 |
| 2,490,627 | 12/1949 | Hofberg | 250/577 |
| 3,505,868 | 4/1970 | Goellenger | 73/293 |
| 3,510,641 | 5/1970 | Reynolds | 362/32 |
| 3,553,666 | 1/1971 | Melone | 73/293 |
| 3,713,338 | 1/1973 | Kind | 73/293 |
| 4,217,778 | 8/1980 | Thayer | 73/293 |
| 4,355,238 | 10/1982 | Ruell | 73/293 |
| 4,387,594 | 6/1983 | Berthold | 350/171 |
| 4,397,182 | 8/1983 | Bakul | 73/293 |
| 4,450,722 | 5/1984 | Keyes, IV et al. | 73/293 |

FOREIGN PATENT DOCUMENTS 2920199  12/1979  Fed. Rep. of Germany .

Primary Examiner—Thomas B. Will
Attorney, Agent, or Firm—Vytas R. Matas; Robert J. Edwards; Eric Marich

[57] ABSTRACT

A device for determining the level of water and/or steam in a boiler is disclosed. The device is a liquid level gauge (10) of the Blackburn type and utilizes an optical fiber cable (44) to intercept the light that passes in a relatively straight path through a cross passage (16) in the body (12) of gauge (10). Due to the difference in the indices of refraction of steam and water, the optical fiber cable (44) intercepts the light when steam is present in the gauge (10) but does not intercept the light when water is present.

2 Claims, 1 Drawing Sheet

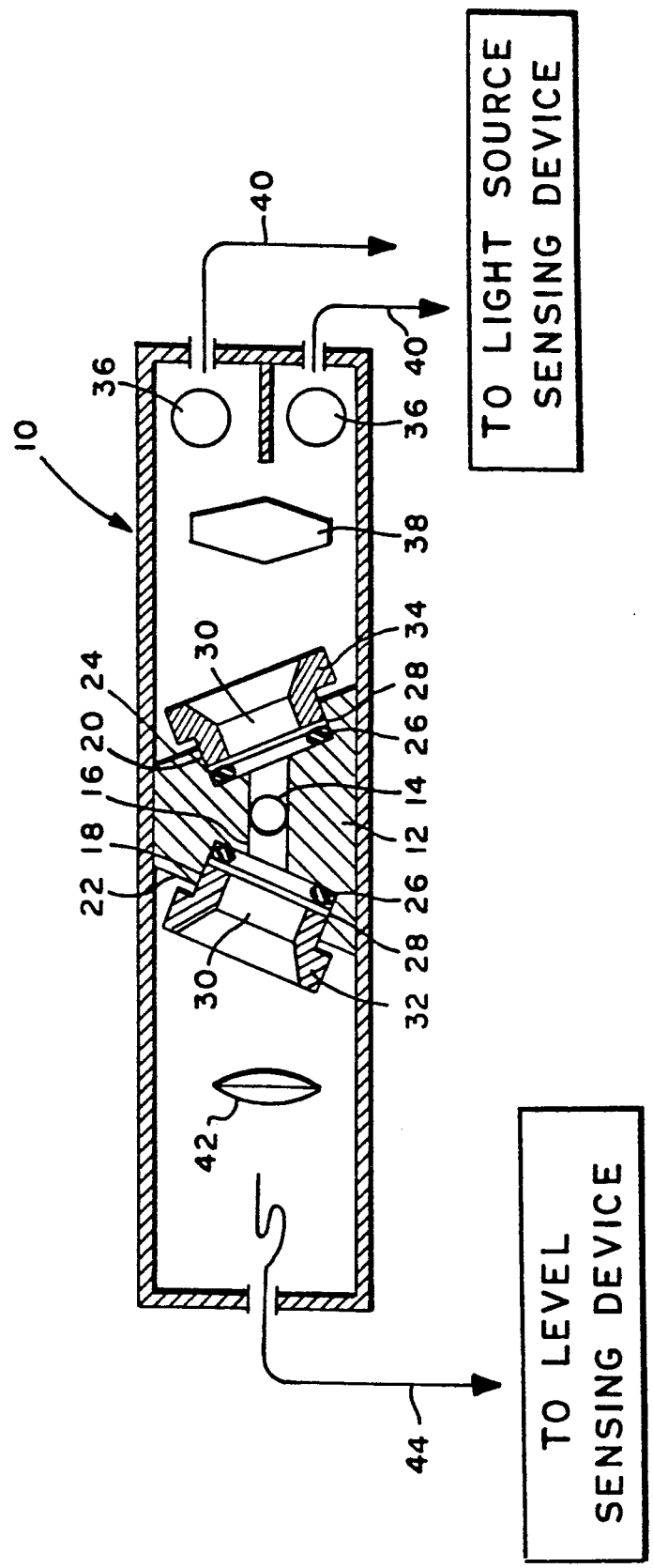

5,072,616

FIBER OPTIC LEVEL ALARM

This is a continuation of application Ser. No. 06/816,968 filed 1/8/86, which is a continuation of application Ser. No. 06/564,941 filed 12/23/83, both now abandoned.

TECHNICAL FIELD

This invention generally relates to a device for determining the level of water and/or steam in a boiler, and more particularly to a water and/or steam level determining device that utilizes optical fibers as a means for transmitting an indication of this level to a remote location.

BACKGROUND ART

A significant advancement with respect to gauges for determining the liquid level within a boiler was the bi-color principle disclosed in the Blackburn U.S. Pat. Nos. 2,024,815 and 2,115,899. The basis for this principle is that steam and water have different indices of refraction. By directing light from differently colored light sources, such as red and green light sources, through a specially formed prismatic gauge tube assembly, the portion of the gauge tube containing steam appears red in color to the observer while the portion of the gauge tube containing water appears green in color. Because of these different colors, this type of gauge makes it possible to easily detect whether the gauge glass is full or empty and minimizes the possibility that the observer might mistake a gauge full of water for a gauge full of steam which could lead to disastrous results.

Variations of the bi-color principle disclosed in the foregoing Blackburn patents have been developed and incorporated into other liquid level gauges in order to minimize the possibility of human error with respect to determining the presence and/or the level of steam or water in a gauge glass. These modifications have minimized the possibility of such human error when viewing the gauge but have not eliminated the possibility of an erroneous reading.

Because of the foregoing, it has become desirable to develop a system which eliminates the possibility of human error when determining the level of steam and/or water in a boiler installation.

SUMMARY OF THE INVENTION

The present invention solves the aforementioned problem associated with the prior art as well as other problems by utilizing an optical fiber cable which is positioned to intercept the light that passes in a relatively straight path through a cross passage in the body of the gauge of the Blackburn type. Because of the relatively low index of refraction of steam as compared to that of water, the optical fiber cable intercepts light when steam is present in the body of the gauge permitting the actuation of a sensing device to indicate the presence of steam. In contrast, when water is present in the body of the gauge, the light is refracted away from the optical fiber cable resulting in the foregoing sensing device remaining unactuated. Redundant light sources are provided to ensure the presence of light in the cross passage provided in the body of the gauge. Optical fibers are also present adjacent each light source to intercept the light produced by same and thus provide an indication to another sensing device that a light source is illuminated at all times.

BRIEF DESCRIPTION OF THE DRAWING

The single FIGURE of the drawing is a cross-sectional view of a liquid level gauge embodying the invention of this disclosure.

DESCRIPTION OF THE PREFERRED EMBODIMENT

Referring now to the drawing where the illustration is for the purpose of describing the preferred embodiment of the present invention and is not intended to limit the invention hereto, the figure is a cross-sectional view of a liquid level gauge 10 utilizing the invention of this disclosure. It should be noted that the Blackburn principle is adhered to in practicing the present invention. The gauge 10 has a body 12 preferably formed of metal so as to have sufficient strength to withstand the designed pressure. The body 12 has a generally trapezoidal cross-section and has a vertical water passage 14 formed therein. A horizontal cross passage 16 extends through the central portion of the body 12 so as to intersect the axis of the water passage 14 and terminates in counterbored openings 18, 20 provided in the front and rear faces 22, 24, respectively of the body 12. The front counterbored opening 18 is positioned so that its axis is perpendicular to the front face 22 of the body 12, and the rear counterbored opening 20 is positioned so that its axis is perpendicular to the rear face 24 of the body 12. A sealing gasket 26, a mica shield 28 and a port glass 30 are provided in each of the counterbored openings 18, 20 and are retained therein by a front clamping plate 32 and a rear clamping plate 34 which are attached by bolts which engage threaded holes in the front face 22 and the rear face 24, respectively, or by other suitable attachment means. The foregoing clamping plates 32, 34 form viewing ports through which the prismatic chamber defined by the internal area between the port glasses 30 can be viewed.

The water passage 14 is adapted to be connected at its upper end to the steam space located within the upper portion of a steam drum of a boiler, and at its lower end to the water space within the boiler. In this manner either water or steam will be observed, depending upon the water level within the boiler, when the prismatic chamber is viewed through the viewing ports.

A plurality of light sources 36 are located adjacent the rear wall of gauge 10. An optical condensing lens 38 is interposed between the plurality of light sources 36 and the rear face 24 of the body 12. The condensing lens 38 is utilized to project a columnar beam of light from each of the light sources 36 into the water passage 14 via the rear counterbored opening 20. An optical fiber 40 is positioned adjacent each of the light sources 36 and passes through the rear wall of the gauge 10 for connection to a sensing device (not shown) which determines whether each of the light sources 36 is illuminated. An optical condensing lens 42 is also interposed between the front face 22 of the body 12 and the front wall of the gauge 10, and is utilized to form the light which passes through the horizontal cross passage 16 into a columnar light beam and project same against the front wall of the gauge 10. An optical fiber cable 44 made up of a plurality of optic fibers is located adjacent the front wall of the gauge 10 and is positioned so as to intercept the beam of light produced by and exiting from the condensing lens 42. The optical fiber cable 44 passes through the front wall of the gauge 10 and is connected to a sensing device (not shown) which senses whether light is being transmitted through the body 12. This latter sensing device and the former sensing device for the light sources can be located at a location remote from the hostile environment in which the gauge is installed.

Inasmuch as steam has a relatively low index of refraction, the light which is directed into the cross passage 16 when steam is present in the water passage 14 will pass in a relative straight path therethrough to the optical fiber cable 44 which, in turn, cause the sensing device associated therewith to sense that light is being transmitted through the body 12 to the fiber cable 44 and thus that steam is present in the water passage 14. Conversely, when water is present in the water passage, the light which is directed into the cross passage 16 is refracted laterally because of the greater index of refraction for water. Because of this, the light beam produced by the condensing lens 42 is refracted and does not intercept the optical fiber cable 44. In this manner, the sensing device associated with the fiber cable 44 is not actuated thus indicating that water is present in the water passage 14.

From the foregoing, it is apparent that a plurality of gauges 10 can be arranged in a stacked relationship and that the water passages 14 can be fluidically interconnected so that the level of steam and/or water within a boiler can be determined incrementally. In this manner, an accurate indication of the level of steam and/or water within a boiler can be obtained.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A liquid level gauge for directly indicating a level of a fluid, comprising:
   a body member having a generally trapezoidal configuration in cross-section, a first port glass provided in one of the side surfaces thereof, a second port glass in the oppositely disposed side surface thereof and a light refracting fluid passage therethrough connecting said first and second port glasses, said first and second port glasses being aligned with and obliquely offset from said light refracting fluid passage;
   a plurality of redundant light sources, located adjacent a rear wall of said gauge provided to ensure the presence of light in said light refracting fluid passage;
   a first condensing lens, interposed between said plurality of light sources and said first port glass, to direct a beam of light from said plurality of light sources through said first port glass into said light refracting fluid passage;
   a second condensing lens, interposed between a first optical fiber cable and said second port glass, said first optical fiber cable being positioned so as to intercept said light beam after it exits from said light refracting fluid passage and passes through said second port glass and said second condensing lens when there is no liquid at said level in said light refracting fluid passage and to not intercept said light beam after it exits from said light refracting fluid passage and passes through said second port glass and said second condensing lens when there is liquid at said level in said light refracting fluid passage; and
   a plurality of optical fibers, one provided adjacent to a respective one of said light sources in said plurality of light sources, positioned so as to intercept a portion of the light produced by said respective one of said light sources and provide an indication as to whether any one of said light sources in said plurality of light sources is illuminated at all times.

2. A liquid level gauge for directly indicating a level of a fluid, comprising:
   a body member having a generally trapezoidal configuration in cross-section, a first port glass provided in one of the side surfaces thereof, a second port glass in the oppositely disposed side surface thereof, and a light refracting fluid passage connecting said first and second port glasses, said first and second port glasses being aligned with and obliquely offset from said light refracting fluid passage;
   two light sources, located adjacent to a rear wall of said gauge, provided to ensure the presence of light in said light refracting fluid passage;
   a first condensing lens, interposed between said two light sources and said first port glass, to direct a beam of light from said two light sources through said first port glass into said light refracting fluid passage;
   a second condensing lens, interposed between said second port glass and a front wall of said gauge, for projecting said beam of light exiting from said light refracting fluid passage against said front wall;
   a multiple optical fiber cable, located adjacent to said front wall, positioned so as to intercept said projected beam of light when there is no liquid in said gauge and to not intercept said projected beam of light when there is liquid in said gauge, said cable being connected to a sensing device which senses whether light is being transmitted through said body member to indicate whether or not said fluid is at said level; and
   two optical fibers, one located adjacent to each of said two light sources, each positioned so as to intercept a portion of the light produced by its adjacent light source, said fibers being connected to another sensing device which determines whether each of said two light sources is illuminated, to eliminate the possibility of human error when determining said level of said fluid.

* * * * *